UNITED STATES PATENT OFFICE.

ERNEST EDWARDS, OF BOSTON, MASSACHUSETTS, ASSIGNOR TO JAMES R. OSGOOD, OF SAME PLACE.

IMPROVEMENT IN METHODS OF PRINTING FROM PLATES OF GELATINE.

Specification forming part of Letters Patent No. 159,166, dated January 26, 1875; Reissue No. 9,000, dated December 23, 1879; application filed October 11, 1879.

*To all whom it may concern:*

Be it known that I, ERNEST EDWARDS, a resident of the city of Boston, Suffolk county, Commonwealth of Massachusetts, have invented a new Method of Printing from Plates of Gelatine or equivalent material, of which the following is a specification.

The object of my invention is to produce impressions from gelatine or analogous substances in any of the colors known as dyes, as distinguished from printing-inks.

My invention is based on the well-known fact that gelatine, gum, albumen, fibrine, and analogous substances are ordinarily absorbent of water, but may be rendered non-absorbent by certain well-known means, such as the formation of chromic acid by the action of light upon bichromatized gelatine, or by the application of chrome-alum or tannin. In previous applications of this principle those portions of the gelatine which by such means are rendered non-absorbent have been used by various devices to produce the print or picture. I have discovered, however, that those portions of the gelatine which, after such treatment, remain still absorbent may also be used to produce a print or picture by causing such remaining absorbent parts to absorb or take up a quantity of water containing in solution any convenient color or dye. It will be readily understood that by placing paper or other suitable material on such a surface and applying sufficient pressure the paper or other material will receive the color from the gelatine plate in just such proportion as the gelatine has been allowed to remain absorbent.

My invention consists in producing impressions with colors known as dyes, as distinguished from printing-inks, from plates consisting of gelatine, gum, albumen, fibrine, or analogous substances which are absorbent of water, the parts which are not required to print having been rendered non-absorbent of water, or otherwise suitably prevented from printing.

I will describe the mode by which I have successfully prepared and printed from such plates according to my said invention.

Upon a suitable surface of metal, wood, stone, glass, or other suitable material I place a layer of gelatine, gum, albumen, fibrine, or analogous substance on which an image has been or is to be produced by rendering such portions as are not required to print non-absorbent of water by any of the well-known means.

In preparing the gelatine or equivalent plate I have found the following to be a convenient formula: I take of gelatine one ounce; water, six ounces; bichromate, thirty grains. I dissolve the gelatine and bichromate in the water heated for the purpose, and spread the mixture upon a surface of slate. When dry, the plate is to be exposed to light upon a photographic positive, (as distinguished from a negative.) After an exposure sufficient to render non-absorbent those parts not to be printed the plate is washed with water till all bichromate has disappeared. It is dried, and is then ready for use. In place of a photographic positive a design or tracing may be used, or the bichromate may be omitted, and a design drawn directly on the gelatine, or transferred thereto, with chrome-alum; or a design may be drawn or transferred to the gelatine in an opaque or water-proof varnish, the portions of the gelatine not covered with the varnish being then rendered non-absorbent; or a stencil-plate or mask may be used, so as to mechanically prevent the portions of the gelatine covered by it from imparting any of the solution in those parts to the paper on which the impression is to be made.

Impressions may be taken from the plate prepared as above described in the following manner: The surface of the prepared gelatine or equivalent plate is to be wetted or dampened with a solution in water of the desired color, and the surplus moisture is to be removed by any convenient means. The paper or other material on which the image is to be printed is then to be pressed upon the surface of the plate, so as to receive a portion of the color.

As the colors to be used in this kind of printing, and known as dyes, are soluble in water, and as these colors are to be applied to the surface of the plate in solution, they will not be absorbed by the parts of the plate which have been rendered non-absorbent of water;

but in the other portions they will be absorbed just in proportion as the absorbent property has been modified by the treatment which the gelatine has received.

Where the colors used are dyes which require mordants to strengthen the color the dyes and mordants may be applied in any convenient manner or order. Care must be taken, however, to use only such dyes or mordants as do not injuriously affect the gelatine plate.

The following are convenient formulas:

First, mordant to be applied to the paper: solution of photochloride of tin, one part; water, nine parts. For wetting or dampening the gelatine plate, a saturated solution of extract of logwood.

Second, a saturated solution of aniline-purple, used alone or with a mordant, where necessary, of perchloride of tin.

Third, chloride of cobalt, one part; water, ten parts.

The image in this case does not appear till heat is applied. On cooling it disappears, and heat is always necessary to redevelop it.

My said process is also applicable to printing on fabrics, and on all other material suitable for receiving the action of dyes.

I do not wish to be understood as claiming the method of producing a wash or stain as a background to the picture or design as described and claimed in Letters Patent granted to me December 10, 1872; but

What I claim as my invention, and desire to secure by Letters Patent, is—

1. The described process of printing from plates of gelatine, gum, albumen, and other analogous bodies which are absorbent of water with soluble colors known as dyes, in contradistinction to those known as printing-inks, the parts not required to produce an impression having been previously rendered non-absorbent of water, and hence incapable of printing, either by exposure to light, the application of a coagulating substance, an opaque varnish or mat, or other suitable means, substantially as specified, and for the purpose set forth.

2. The process of producing impressions in colors soluble in water of images, tracings, or designs from plates of gelatine, gum, albumen, and other analogous bodies, which consists in causing the gelatine to take up the color in solution, and then pressing the paper or other material on which the image is to be produced upon the gelatine prepared with color, substantially as described.

3. A plate of gelatine, gum, albumen, or other analogous bodies having an image or design produced therein by the absorption of colors soluble in water and capable of reproducing such design upon paper or other suitable material by the application of pressure, substantially as described.

ERNEST EDWARDS.

Witnesses:
GEO. A. COOLIDGE,
WALTER ROWLANDS.